United States Patent
Chevallier

(10) Patent No.: US 10,220,650 B2
(45) Date of Patent: Mar. 5, 2019

(54) METHOD FOR MANUFACTURING AN ITEM IN THE FORM OF A SHEET, PARTICULARLY A DECORATIVE ITEM

(71) Applicant: CORSO MAGENTA, Nanterre (FR)

(72) Inventor: Stanislas Chevallier, La Celle Saint Cloud (FR)

(73) Assignee: CORSO MAGENTA, Nanterre (FR)

( * ) Notice: Subject to any disclaimer, the term of this patent is extended or adjusted under 35 U.S.C. 154(b) by 0 days.

(21) Appl. No.: 15/541,578

(22) PCT Filed: Jan. 5, 2016

(86) PCT No.: PCT/IB2016/050032
§ 371 (c)(1),
(2) Date: Jul. 5, 2017

(87) PCT Pub. No.: WO2016/110799
PCT Pub. Date: Jul. 14, 2016

(65) Prior Publication Data
US 2017/0355217 A1 Dec. 14, 2017

(30) Foreign Application Priority Data

Jan. 5, 2015 (FR) .................................. 15 50021

(51) Int. Cl.
| | |
|---|---|
| *B44C 1/17* | (2006.01) |
| *B44C 1/10* | (2006.01) |
| *B32B 5/02* | (2006.01) |
| *B32B 7/06* | (2019.01) |
| *B32B 27/12* | (2006.01) |
| *B32B 27/32* | (2006.01) |
| *B32B 27/36* | (2006.01) |
| *B32B 5/24* | (2006.01) |
| *C09D 4/06* | (2006.01) |

(52) U.S. Cl.
CPC .............. *B44C 1/105* (2013.01); *B32B 5/022* (2013.01); *B32B 5/24* (2013.01); *B32B 7/06* (2013.01); *B32B 27/12* (2013.01); *B32B 27/32* (2013.01); *B32B 27/36* (2013.01); *C09D 4/06* (2013.01); *B32B 2255/02* (2013.01); *B32B 2255/10* (2013.01); *B32B 2255/26* (2013.01); *B32B 2262/0253* (2013.01); *B32B 2262/0276* (2013.01); *B32B 2262/062* (2013.01); *B32B 2262/101* (2013.01); *B32B 2307/718* (2013.01); *B32B 2307/748* (2013.01); *B32B 2451/00* (2013.01); *B32B 2605/00* (2013.01); *B32B 2607/00* (2013.01)

(58) Field of Classification Search
CPC ....... B44C 1/17; B44C 1/1741; B44C 1/1745; B32B 5/24; B32B 7/06; B32B 27/12
USPC ....... 427/146, 147, 152; 156/239; 428/195.1
See application file for complete search history.

(56) References Cited

FOREIGN PATENT DOCUMENTS

| | | | | |
|---|---|---|---|---|
| WO | 9956682 A1 | 11/1999 | | |
| WO | 0149908 A2 | 7/2001 | | |
| WO | WO 01/49908 | * 7/2001 | ............... | D01F 8/00 |
| WO | 2006084865 A2 | 8/2006 | | |
| WO | WO 2006/084865 | * 8/2006 | ............. | B32B 27/06 |

OTHER PUBLICATIONS

International Search Report in corresponding International Patent Application No. PCT/IB2016/050032, dated Apr. 15, 2016. 2 pages.

* cited by examiner

*Primary Examiner* — Bruce H Hess
(74) *Attorney, Agent, or Firm* — Leason Ellis LLP

(57) ABSTRACT

The invention relates to a method for preparing a sheet item that is intended to be attached to a permanent carrier. The method includes the following steps: —applying at least one layer (201, 202, 203), of material to be painted, onto a temporary carrier (10), the temporary carrier being selected so that, after drying, the temporary carrier (10) is separated by peeling from the layer of material to be painted or the first layer of material to be painted; before the layer of material to be painted or the last layer of material to be painted has completely dried, —applying, directly onto the free surface of the same, a non-adhesive fibrous material backing layer (30) under mechanical conditions suitable for creating partial interpenetration of the fibers of the material of the backing layer (30) and the undried material (203) to be painted; and after drying, —permanently anchoring the layer(s), of material to be painted, onto said backing layer (30).

13 Claims, 2 Drawing Sheets

FIG. 1E FIG. 1F

METHOD FOR MANUFACTURING AN ITEM IN THE FORM OF A SHEET, PARTICULARLY A DECORATIVE ITEM

CROSS-REFERENCE TO RELATED PATENT APPLICATIONS

This application is a U.S. National Phase Application under 35 U.S.C. § 371 of International Patent Application No. PCT/IB2016/050032, filed Jan. 5, 2016, and claims priority of FR 15/50021, filed Jan. 5, 2015, all of which are incorporated by reference in their entireties. The International Application was published on Jul. 14, 2016 as International Publication No. WO 2016/110799 A1.

FIELD OF THE INVENTION

This invention relates generally to finishing films, particularly paint- or varnish-based decorative films.

STATE OF THE ART

Various literatures have previously described different techniques for manufacturing a film of dry paint to be applied onto a permanent carrier.

Particular reference is made to documents WO2006084865A2, WO2010139778A2 and WO2012072794A1 having inventors in common with those of the present application.

In all of these known techniques, one or more layers of paint, varnish, etc. are applied onto a so-called molding layer, which will give the film its final surface appearance, and different approaches are adopted to transfer this film onto its permanent carrier. This transfer uses in a general way the application of adhesive and one or more thin temporary carriers. In certain cases, such a carrier film can be an adhesive in a quiescent state.

These known methods, although effective, require a certain number of more of less complex operations in order to create the layer(s) of paint and combine then with other films to obtain the commercial end product to be applied onto the final carrier. Moreover, in some embodiments, applying the film onto its permanent layer requires particular skills or delicacy.

With particular regard to document WO2006084865A2, it will be noted that the assembly of a film of paint and a textile—or similar type of carrier is always achieved by interposing a deactivatable adhesive, the film of paint being designed to be separated from its carrier at a certain stage.

Lastly, as a reminder, document WO0149908A2 describes the stratification of a polyolefin film with a non-woven material, using a specific adhesive between the two of them.

SUMMARY OF THE INVENTION

The invention aims to simplify the manufacture of an item designed to give to a permanent carrier a controlled aspect, and in particular to propose a method for manufacturing such an item that is simple and economic, without using an adhesive. Another aim of the invention is to enable a sheet item to be made which is strong and simple to apply, whilst being adaptable to a certain extent to non-flat or non-regular final carriers.

Lastly, another aspect of the invention is to produce an item whose final render is not dependent on the characteristics, in particular relief, porosity, etc., of the final carrier.

To this end, a method is proposed for preparing a sheet item designed to be fixed onto a permanent carrier, the method comprising the following steps:
  applying at least one layer, of paint material onto a temporary carrier, the temporary carrier being selected so that, after drying, the temporary carrier can be separated by peeling from the layer of paint material or the first layer of paint material, and
  before the layer of paint material or the last layer of paint material has completely dried, —applying directly, onto the free surface thereof, a non-adhesive fibrous material backing layer under mechanical conditions suitable for creating partial interpenetration of the fibers of the material of the backing layer and the undried paint material and, after drying, permanently anchoring the layer(s) of paint material, onto said backing layer.

Certain preferred but non-limiting aspects of this method comprise the following characteristics, taken individually or in all combinations that a person skilled in the art would understand as being technically compatible:
  the temporary carrier is a molding carrier whose surface finish is transferred in negative form to the layer of paint material or to the first layer of paint material;
  the backing layer of fibrous material is a non-woven sheet;
  the non-woven sheet comprises fibers of at least one material chosen from the group comprising glass, polyesters, cellulose and polypropylene;
  the non-woven sheet also comprises a binder;
  the thickness of the backing layer is between around 50 and 400 µm;
  the grams per square meter of the backing layer are between around 10 and 150 $g/m^2$;
  the layer of paint material or the last layer of paint material has a thickness of between around 15 and 150 µm after drying;
  the step of applying the backing layer is implemented with an application pressure obtained by reducing the thickness of the assembly comprising the temporary carrier, the layer(s) of paint material and the backing layer up to a value of between around 65 and 95% of the sum of their thicknesses in the free state;
  the method comprises the application of several layers of paint material, among which a finishing layer directly in contact with the temporary carrier and a primer layer adapted to receive the thin backing layer;
  the method comprises a supplementary step for separating the temporary carrier along with the layer of paint material or along with the first layer of paint material, once dried;
  the method also comprises a step of applying a peelable protective film onto the free surface of the layer(s) of paint material detached from the temporary carrier;
  the temporary carrier is designed to be left on the sheet item until the latter is installed and takes the place of a peelable protective layer.

A method is also proposed for manufacturing several sheet items successively, where the temporary carrier is removed each time, characterised in that it comprises several implementations of the method as defined above with the same temporary carrier.

BRIEF DESCRIPTION OF THE DRAWINGS

Other aspects, aims and advantages of the present invention will emerge more clearly from the following detailed description of a preferred embodiment thereof, given by way of non-limiting example and made with reference to the accompanying drawings, in which:

FIGS. 1A to 1G are enlarged-scale cross-sectional views showing a series of steps of a method according to the invention.

DETAILED DESCRIPTION OF A PREFERRED EMBODIMENT

With reference firstly to FIGS. 1A to 1G, a detailed description will be given of a method for manufacturing an item for applying a paint- or varnish-based decorative film onto a permanent carrier.

The permanent carrier can be of various types. It may be a wall or a ceiling of a building, a vehicle such as an aircraft, etc.

In a first step (FIG. 1A), a molding carrier 10 is provided, having on one of its faces 10a surface properties that will determine the finish of the dry sheet of paint or varnish carried by its backing as will be explained below.

This molding carrier is made for example of one of the following materials: polypropylene, polyethylene, polyethylene terephthalate or siliconized paper. It can be smooth or have any desired recessed or relief pattern, such as a material effect or micro-grooves or micro-ribs, obtained for example by calendaring.

Depending on the material used for the carrier, its thickness is typically between around 30 and 200 μm.

Figure 1A:
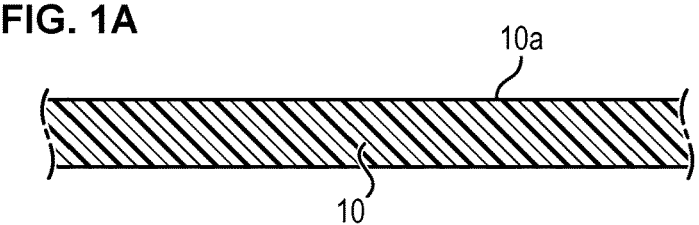
Figure 1B:
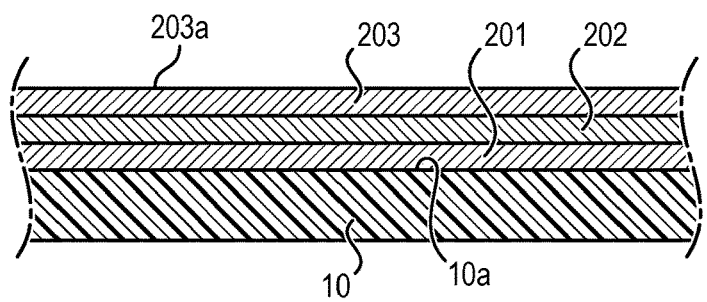

With reference to FIG. 1B, onto the face 10a of the molding carrier 10 one or more layers of paint material are applied. This can typically involve a paint based on a water-borne resin of an acrylic, vinyl or alkyd type, on a solvent-borne resin of a glycerophtalic or polyurethane type, on a two-component resin, for example of an epoxy type, with or without solvent, usually containing fillers and pigments. As a variation, one or several layers of varnish based on said resins, or a combination of at least one layer of paint and at least one layer of varnish may be used.

Depending on the function of the item to be produced and the desired render, one or more layers of paint material are applied.

Various techniques can be used to apply the paint material. It can be applied with a scraper, brush, spray gun, etc., these operations preferably being automated on an application station as the molding carrier 10 is unwound from a roller and conveyed through this station.

FIG. 1B shows the case where there has been applied successively onto the face 10a of the carrier 10 a finishing layer 201, an intermediate layer 202 and a layer 203 playing the role of a primer in the end product, with thicknesses for example in the order of 15 to 150 μm each (or even with paints or varnishes hardening by cross-linking, without constraints of evaporation of solvent). An appropriate drying time is allowed between the applications of the different layers, with the exception of the last layer 203 as will be explained below.

These thicknesses can be identical or different. It will be noted that the thickness of the layer applied last can be greater than, equal to or less than that of the other layer(s).

Figure 1C:
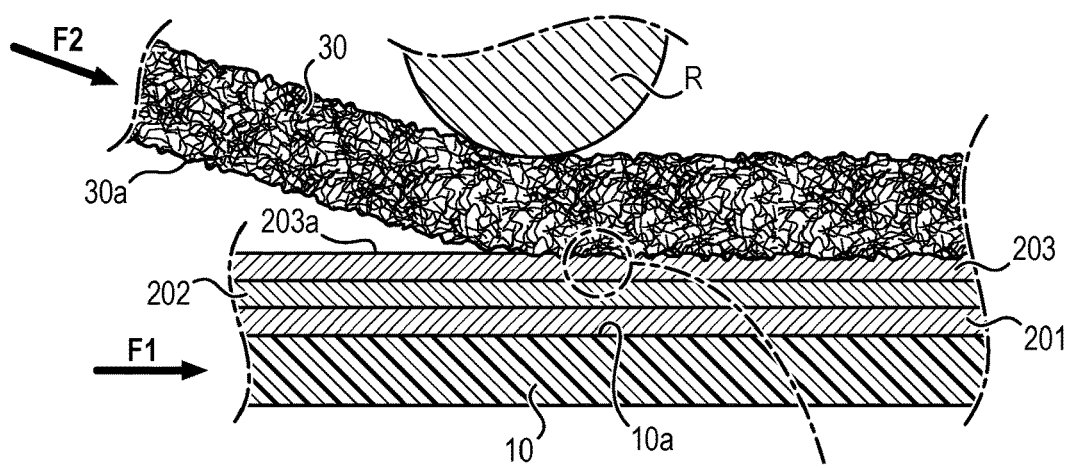

According to an aspect of the invention, and with reference to FIG. 1C, a backing (30) or carrier layer is applied directly to the free face 203a of the last layer of deposited paint material. In order to anchor this backing in the paint material by the application of said backing, this application is performed rapidly after applying the last layer 203 of paint material (or the single layer of paint material when only one layer is envisaged), before the latter dries.

This backing 30 is advantageously formed by a thin sheet of fibrous material, and more preferably a sheet of non-woven material based on fibers of one or more materials chosen preferably from the group comprising glass, polyester, cellulose, polypropylene, non-adhesive, having a porosity such that, during this application, the paint material that is not dry partially saturates the structure of the backing, migrating to the heart of this structure through its free spaces. In this way, after the paint or varnish (depending on the type of resin, evaporation of solvent and coalescence, and/or cross-linking) dries, an extremely strong anchorage of the paint or varnish on its backing 30 is achieved.

In a preferred embodiment, the backing is a non-woven glass sheet ranging in thickness from 50 to 500 μm, more preferably around 150 to 400 μm, and with a grams per square meter of between around 10 and 150 g/m².

Figure 2:
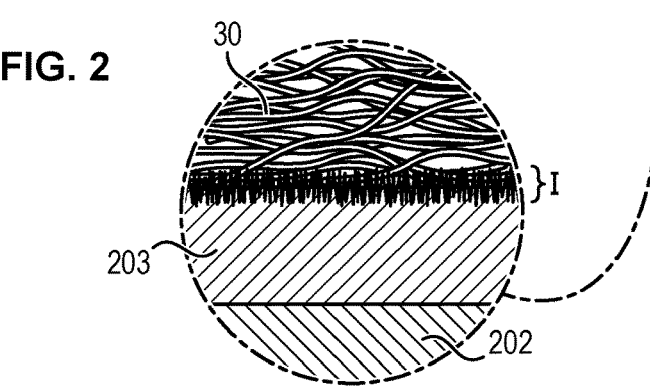
FIG. 2 is an enlargement of a part of FIG. 1C.

The application pressure is selected to ensure a controlled interpenetration of the undried painted material and fibers of the non-woven material, as shown in FIG. 2, which is a partial view on an enlarged scale of an area of FIG. 1C. The corresponding "fuzzy" interface is shown by the reference I.

As FIG. 1C also shows, the assembly of the backing 30 on the complex formed by the molding carrier 10 and the layers of painted material 201, 202, 203, is preferably achieved in an assembly station where the elements to be assembled are conveyed at the same speed (arrows F1 and F2) and where a pressure roller R performs the assembly by applying the desired pressure. The counter-roller is not shown for the sake of simplicity. The desired application pressure is obtained by selecting a dimension of the gap between the roller and counter-roller which is equal to around 65 to 95% of the sum of the thicknesses of the elements conveyed (temporary carrier provided with the layer(s) of paint material, the last being undried+backing). The value of this percentage is selected in particular on the basis of the type of backing and the type of the layer of paint material in which the backing is anchored.

The basic parameters that determine the quality of the anchoring are the thickness of the layer of painted material (or of the last layer), its viscosity when the backing is applied, the thickness of the backing, the porosity or wettability of the backing (on which the average diameter of the glass fibers has an influence), the pressure of application of the backing on the free face of the layer(s) of painted material, the speed of movement in the direction of arrows F1 and F2 and the diameter of the roller R.

Figure 1D:
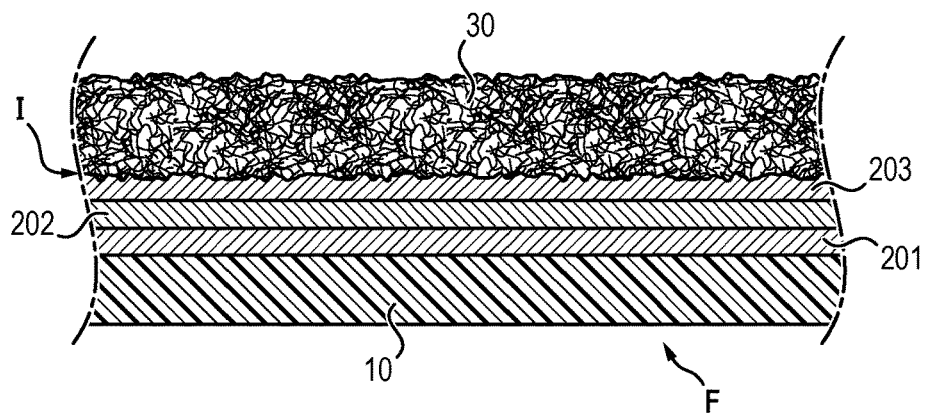
Figure 1D:
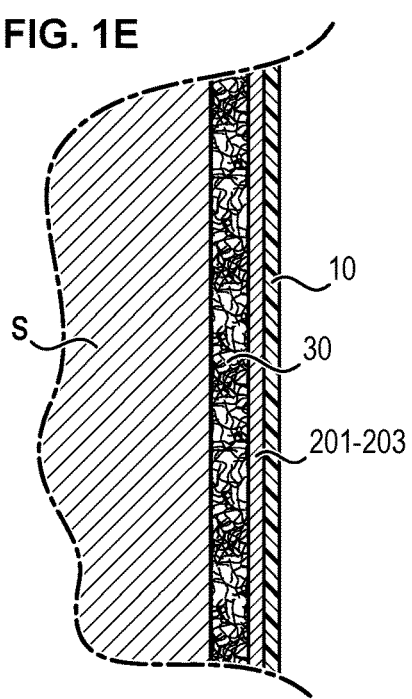
Figure 1D:
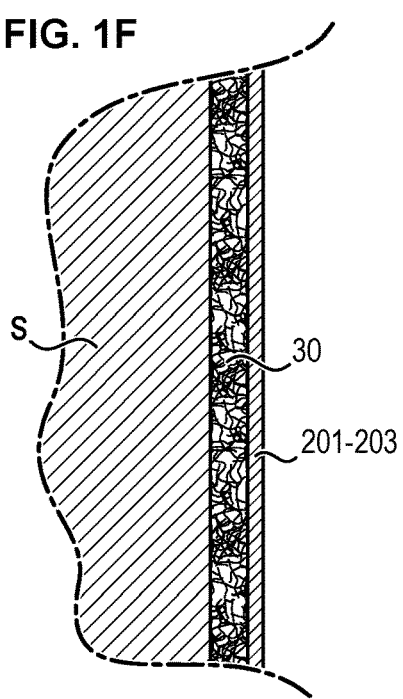

Once the backing 30 is applied onto the layer(s) of painted material and once the last layer of painted material (here 203), or the single layer of painted material has dried, the structure shown in FIG. 1D is obtained.

In a first approach, the molding carrier 10 can be left in place and play the role of a removable protective film for the dried painted material. In this case, the item is applied onto a final carrier S after gluing the item and/or the final carrier, as shown in FIG. 1E, then the molding carrier is peeled off by hand to expose the layer(s) of painted material and possibly recovered in order for its material to be recycled.

The final structure of the sheet item is shown in FIG. 1F.

The adhesive used depends in particular on the type of carrier. For a carrier of the type used in a building, preferably a water-borne adhesive is used, such as EVA (ethylene vinyl acetate copolymer) or PVAc (polyvinyl acetate), preferably applied onto the final carrier. A person skilled in the art will in any event know how to adapt the choice of adhesive to the nature of the final carrier S and to the conditions to which a final carrier/sheet item assembly is designed to be exposed.

As a variation, it is possible to render the sheet item more complex with a layer of adhesive material located on the face opposite the layer(s) of painted material, and protected by a peelable film in order to prevent handling the material during the wet phase on fixing to the final carrier. In this case, the peelable film is removed before application then the item is applied onto the final carrier.

Note that, if the molding carrier is left inside the end product, it is chosen in particular on the basis of economic criteria, its nature and its thickness having a direct influence on the cost price of the finished item.

In a second approach, the molding carrier 10 is removed from the assembly shown in FIG. 1D after drying, in order to be reused for a new performance of the manufacturing method. In this case, it can be replaced by a thin self-adhesive peelable protective film 40 of a known type, whose surface quality or thickness are not critical and which can therefore be economical. This peelable film is removed after application.

Figure 1G:
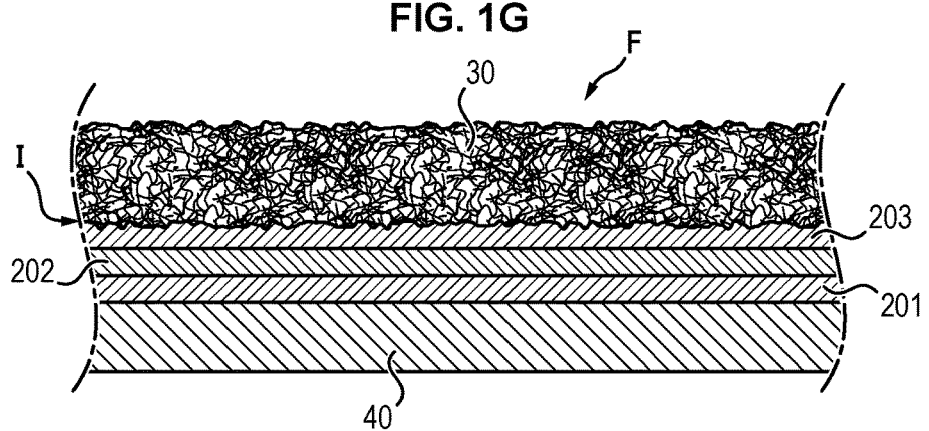

The corresponding sheet item is shown in FIG. 1G.

The method according to the invention provides an item that can be packaged in rolls that can be easily handled thanks to the robustness of the backing and that completely masks the surface finish of the final carrier, provided that it is reasonably free of roughness (small recesses are possible).

Clearly, the present invention is in no way limited to the embodiments described and illustrated, but a person skilled in the art would be capable of applying any variation or modification thereto.

In particular, all or part of the layers of paint material can be functionalized, for example in accordance with the teachings of document WO2010/139778A2.

The invention claimed is:

1. A Method for preparing a sheet item designed to be fixed onto a permanent carrier, the method comprising the following steps:
    applying at least one layer, of paint material, onto a temporary carrier, the temporary carrier being selected so that, after drying, the temporary carrier can be separated from the layer of paint material or the first layer of paint material by peeling, and
    before the layer of paint material or the last layer of paint material has completely dried, applying directly, onto the free surface thereof, a non-adhesive fibrous material backing layer under mechanical conditions suitable for creating partial interpenetration of the fibers of the material of the backing layer and the undried paint material and, after drying permanently anchoring the layer of paint material, onto said backing layer;
    wherein the step of applying the backing layer is implemented with an application pressure obtained by reducing the thickness of the assembly comprising the temporary carrier, the layer of paint material, and the backing layer up to a value of between around 65 and 95% of the sum of their thicknesses in the free state.

2. The Method according to claim 1, wherein the temporary carrier is a molding carrier whose surface finish is transferred in negative form to the layer of paint material or to the first layer of paint material.

3. The Method according to claim 1, wherein the backing layer of fibrous material is a non-woven sheet.

4. The Method according to claim 3, wherein the non-woven sheet comprises fibers of at least one material chosen from the group comprising glass, polyesters, cellulose, polypropylene, and a binder.

5. The Method according to claim 4, wherein the non-woven sheet also comprises a binder.

6. The Method according to claim 3, wherein the thickness of the backing layer is between around 50 and 400 µm.

7. The Method according to claim 3, wherein the grams per square meter of the backing layer are between around 10 and 150 g/m2.

8. The Method according to claim 1, wherein the layer of paint material or the last layer of paint material has a thickness of between around 15 and 150 µm after drying.

9. The Method according to claim 1 wherein it comprises the application of several layers of paint material, among which a finishing layer directly in contact with the temporary carrier and a primer layer adapted to receive the thin backing layer.

10. The Method according to claim 1, wherein it comprises an additional step of separating the temporary carrier from the layer of paint material or from the first layer of paint material, once dried.

11. The Method according to claim 10, wherein it also comprises a step of applying a peelable protective film onto the free surface of the layer(s) of paint material detached from the temporary carrier.

12. The Method for manufacturing several sheet items successively, wherein it comprises several implementations of the method according to claim 10 with the same temporary carrier.

13. The Method according to claim 1, wherein the temporary carrier is adapted to remain on the sheet item (F) until the latter is installed and takes the place of a peelable protective layer.

* * * * *